(12) United States Patent
Cayssials et al.

(10) Patent No.: US 11,524,192 B2
(45) Date of Patent: Dec. 13, 2022

(54) AIRCRAFT PROPULSION ASSEMBLY COMPRISING A FIRE-FIGHTING SYSTEM WITH A LINE FOR DISTRIBUTING EXTINGUISHING AGENT

(71) Applicant: Airbus Operations (S.A.S.), Toulouse (FR)

(72) Inventors: Julien Cayssials, Toulouse (FR); Adeline Soulie, Toulouse (FR); Arnaud Guichot, Toulouse (FR); Nicolas Brachet, Blagnac (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/362,568

(22) Filed: Jun. 29, 2021

(65) Prior Publication Data
US 2022/0001223 A1   Jan. 6, 2022

(30) Foreign Application Priority Data
Jul. 2, 2020 (FR) ...................................... 2007005

(51) Int. Cl.
   *A62C 3/08*       (2006.01)
   *A62C 35/68*      (2006.01)
   *B64D 45/00*      (2006.01)
(52) U.S. Cl.
   CPC ............... *A62C 3/08* (2013.01); *A62C 35/68* (2013.01); *B64D 2045/009* (2013.01)
(58) Field of Classification Search
   CPC ...... A62C 3/08; A62C 35/68; B64D 2045/009
   USPC ......................................................... 169/62
   See application file for complete search history.

(56) References Cited

U.S. PATENT DOCUMENTS

| 10,336,464 B2 | 7/2019 | Charlemagne et al. |
| 2020/0240361 A1 | 7/2020 | Schacht |

FOREIGN PATENT DOCUMENTS

| DE | 10 2018 222162 A1 | 6/2020 |
| FR | 3 014 133 A1 | 6/2015 |
| FR | 3 015 568 A1 | 6/2015 |

OTHER PUBLICATIONS

French Search Report for Application No. 2007005 dated Mar. 8, 2021.

*Primary Examiner* — Christopher S Kim
(74) *Attorney, Agent, or Firm* — Jenkins, Wilson, Taylor & Hunt, PA

(57) ABSTRACT

A propulsion assembly including a turbomachine attached to a pylon, and a fire-fighting system, the turbomachine including fire zones, the fire-fighting system including two reservoirs of pressurized extinguishing agent in the pylon and a distribution line connecting the reservoirs to nozzles. The distribution line includes connected pipes having a low point between the reservoirs and the nozzles, and, for each low point, a fluid drainage device for evacuating fluid. The drainage device includes a fluid passage for fluid evacuation from the distribution line and a mechanism for shutting off the fluid passage, the mechanism movable under effect of distribution line pressure, between a first position where it opens the fluid passage and a second position where it closes the fluid passage, the second position being reached when the pressure in the distribution line is greater than or equal to a predetermined pressure.

7 Claims, 4 Drawing Sheets

AIRCRAFT PROPULSION ASSEMBLY COMPRISING A FIRE-FIGHTING SYSTEM WITH A LINE FOR DISTRIBUTING EXTINGUISHING AGENT

CROSS-REFERENCE TO RELATED APPLICATION

This application claims priority to French patent application number 20 07005 filed on Jul. 2, 2020, the entire disclosure of which is incorporated by reference herein.

TECHNICAL FIELD

The disclosure herein relates to an aircraft propulsion assembly comprising a fire-fighting system with a distribution line for distributing a pressurized extinguishing agent.

BACKGROUND

In a known manner, a propulsion assembly fastened beneath the wing of an aircraft comprises a turbomachine, a pylon for fastening the turbomachine to the aircraft, and a fire-fighting system for detecting and extinguishing a fire occurring in the propulsion assembly.

The fire-fighting system contains two reservoirs of extinguishing agent with controlled opening that are arranged in the pylon, a distribution line, in the form of piping, connecting the reservoirs to fire zones in the turbomachine, and a detection and activation assembly for detecting a fire and commanding the opening of the reservoirs in order to trigger the emission of extinguishing agent from the reservoirs towards the fire zones along the distribution line.

The space available in the pylon for the distribution line of the fire-fighting system to pass through is limited and constrained by the presence of a plurality of systems. In certain aeroplanes, it is not possible to route the line for distributing the extinguishing agent without locally generating at least one low point.

Since the distribution line is a standby line, it is filled with ambient air that enters from the fire zones. This air contains moisture that condenses and accumulates at the low points, and freezes when the aircraft flies at high altitude, thereby preventing correct operation of the fire-fighting system. A drainage device in the form of a hole is consequently arranged at each low point so as to evacuate, under gravity, the water that could accumulate there.

Such a drainage hole is effective for evacuating stagnant water, but in the event that a reservoir is opened, some of the extinguishing agent is lost through this hole. This means that it is necessary to increase the volume of extinguishing agent in the reservoir so as to compensate for this loss, and results in reservoirs that are more voluminous and therefore more difficult to integrate into the pylon.

There is therefore a need to find a solution to this problem of extinguishing agent being lost through the drainage device, in order to be able to reduce the dimensions of the reservoirs and make them easier to integrate into the pylon.

SUMMARY

The disclosure herein aims to meet all or part of this need and relates to a propulsion assembly comprising a turbomachine attached to a pylon, and a fire-fighting system, the turbomachine comprising a plurality of fire zones, the fire-fighting system comprising two reservoirs of pressurized extinguishing agent that are situated in the pylon and a distribution line that connects each of the reservoirs to nozzles situated in the fire zones, the distribution line comprising a set of pipes that are connected to one another and having at least one low point between the reservoirs and the nozzles, and, for each low point, a fluid drainage device for evacuating a fluid from the distribution line, the drainage device comprising a fluid passage for evacuation of the fluid out of the distribution line and a mechanism for shutting off the fluid passage, the mechanism being able to move under the effect of the pressure prevailing in the distribution line, between a first position in which it opens the fluid passage and a second position in which it closes the fluid passage, the second position being reached when the pressure in the distribution line is greater than or equal to a predetermined pressure.

Thus, at a pressure close to atmospheric pressure (i.e. on the ground or in flight) the water resulting from the condensation will be evacuated from the distribution line such that lumps of ice cannot form. By contrast, the pressurized extinguishing agent will not be evacuated from the distribution line. The disclosure herein thus makes it possible to avoid increasing the volume of extinguishing agent in the reservoirs (aimed at compensating for the loss of agent through the drainage hole in the prior art) and therefore to limit the volume/mass of the on-board reservoirs.

BRIEF DESCRIPTION OF THE DRAWINGS

The abovementioned features of the disclosure herein, along with others, will become more clearly apparent upon reading the following description of an exemplary embodiment, the description being given with reference to the appended drawings, in which.

DETAILED DESCRIPTION

Figure 1:
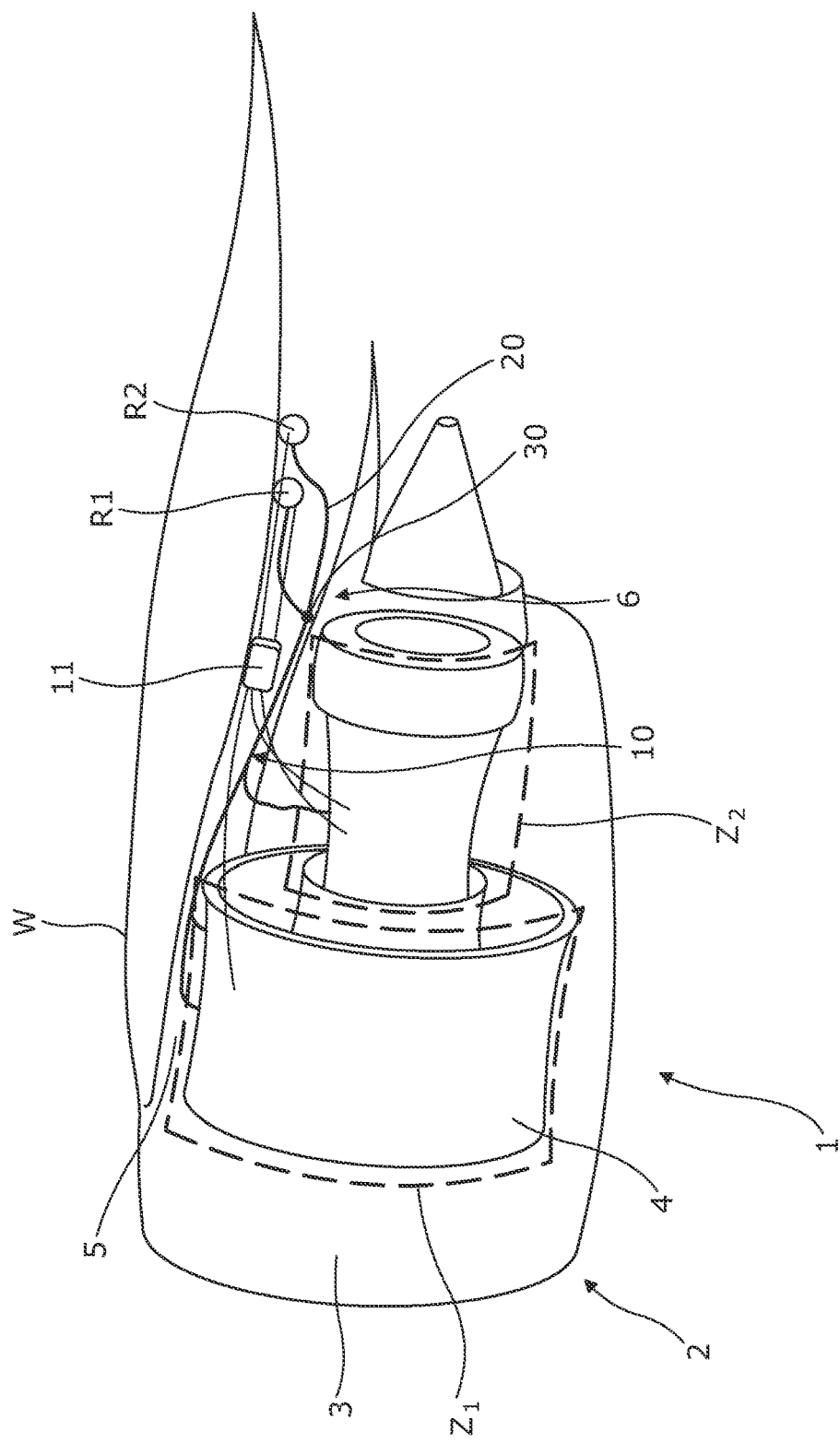
FIG. 1 is a schematic representation of an aircraft propulsion assembly that comprises a line for distributing pressurized extinguishing agent according to the disclosure herein.

With reference to FIG. 1, a propulsion assembly 1 is attached beneath the wing W of an aircraft (not shown) and has a turbomachine 2 comprising a nacelle 3 surrounding an engine 4, a pylon 5 that is fastened to the wing W and beneath which the turbomachine 2 is attached, and a fire-fighting system 6.

The turbomachine 2 comprises a plurality of fire zones Z1, Z2, separated from one another by walls and fire seals (not shown) so as to contain a fire within the boundaries of one fire zone and prevent it from spreading to another fire zone.

The fire-fighting system 6 is designed to detect and extinguish, via the sending of an extinguishing agent, any fire that may occur in one of the fire zones Z1, Z2. Conventionally, the fire-fighting system 6 contains two reservoirs R1, R2 with controlled opening that each contain a volume of pressurized extinguishing agent, a line 10 for distributing extinguishing agent connecting each of the reservoirs R1, R2 to nozzles (not shown) for ejecting extinguishing agent that are situated in the fire zones Z1, Z2, and a detection and activation unit 11 for detecting a fire and commanding the opening of the reservoirs R1, R2.

Each reservoir R1, R2 is situated in the pylon 5 and is equipped with an opening system for releasing the extinguishing agent from the reservoir R1, R2. The opening system (not shown) is for example of the butterfly valve type, or is a strike-initiated valve of the pyrotechnic type.

The detection and activation unit 11 comprises a central unit to which are connected a plurality of fire sensors that are situated in the fire zones Z1, Z2 so as to detect a fire in the latter, and the central unit is also connected to the systems for opening the reservoirs so as to control the opening thereof. The detection and activation unit 11 is connected to controls and devices of the aircraft. When a fire is detected, the detection and activation unit 11 sends a fire alarm signal intended for the pilots. The cockpit comprises two activation controls, each being associated with a single reservoir R1, R2 and able to be actuated by the pilot so as to send a signal for activating the associated reservoir to the detection unit. When a control associated with a reservoir R1, R2 is activated, the detection and activation unit 11 sends an opening signal to the system for opening the reservoir so as to open the reservoir R1, R2. When a reservoir R1, R2 is opened, the extinguishing agent released moves under pressure in the distribution line and is expelled into the fire zones Z1, Z2 through the ejection nozzles.

The distribution line 10 comprises piping made up of pipes 20 that are connected to one another so as to ensure the circulation of the extinguishing agent. The distribution line 10 comprises one or more low points 21 (only one is shown). A low point 21 is a point on the distribution line 10 at which fluids have a tendency to accumulate as a result of the lower height of this point relative to the points of the distribution line 10 that are situated directly upstream and downstream of the low point 21. The terms upstream and downstream are chosen depending on the direction of flow of the extinguishing agent in the distribution line, i.e. from the reservoirs R1, R2 to the nozzles.

In a known manner, the distribution line 10 comprises a drainage device 30 arranged at each low point 21 with a fluid passage P allowing the fluids to be evacuated from the distribution line 10.

Figures 2A, 2B:
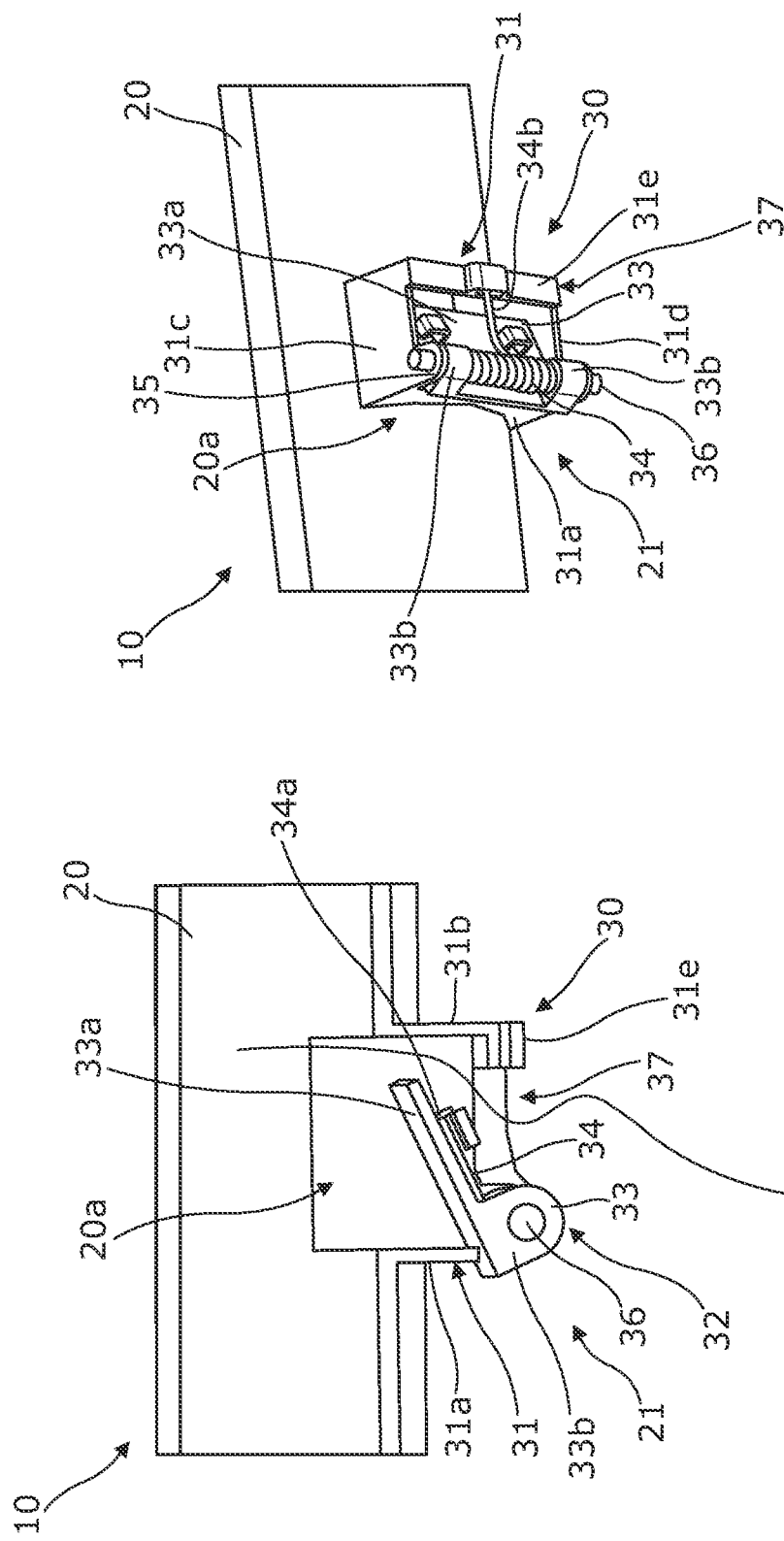
FIG. 2A is a sectional view of a drainage device of the distribution line in FIG. 1, according to a first embodiment of the disclosure herein.
FIG. 2B is a perspective view of the drainage device shown in FIG. 2A.

According to the disclosure herein, and with reference to FIGS. 2A-2B, the drainage device 30 comprises a chassis 31 fastened to a pipe 20, and a mechanism 32 for shutting off the fluid passage P, fastened to the chassis 31, which comprises a mobile device of the mobile shutter 33 type and elastic mechanism 34 mechanically coupled to the shutter 33.

The chassis 31 has the overall shape of an open housing with four lateral walls 31a-d that are parallel in pairs and a planar wall 31e that is fastened to the four lateral walls and forms the bottom of the chassis 31. The lateral walls 31a-d are all fastened to the distribution line 10, for example by leaktight welding, at an opening 20a made in a pipe 20 in line with the low point 21.

The lateral walls 31a-d extend out of the pipe, towards the bottom thereof, in order not to impede the circulation of the extinguishing agent. The bottom 31e of the chassis is thus at a distance from the pipe 20.

For a pair of mutually parallel lateral walls 31c-d, each of the lateral walls is provided with a through-orifice 35. The through-orifices 35 in the two lateral walls are identical and aligned. A shaft 36, known as a pin, is inserted through the two through-orifices 35.

The bottom 31e comprises, for its part, an opening 37 for allowing evacuation of the liquids at the low point 21. A fluid can flow in the fluid passage P that goes from the pipe 20 to the drainage device 30 and comprises the opening 20a made in the pipe 20 in line with the low point 21 and then the opening 37 in the bottom 31e of the chassis.

The shutter 33 of the shut-off mechanism 32 comprises a panel 33a to which are fastened two articulation fittings 33b, distributed on either side of the width of the panel 33a, each being provided with an orifice (not shown) for the pin 36 to pass through. The articulation fittings 33b are fitted onto the pin 36 such that the shutter 33 is mounted in a pivot connection on the chassis between a rest position in which it opens up the opening 37 in the bottom 31e and opens the fluid passage P, and a shut-off position in which it shuts off the opening 37 and closes the fluid passage P, thus preventing the flow of a fluid out of the distribution line 10.

The elastic mechanism 34 is a torsion spring fitted onto the pin 36 and arranged between the two articulation fittings 33b of the shutter. A first end 34a of the spring is fastened to the panel 33a of the shutter while a second end 34b of the spring is fastened to the chassis 31, for example fastened to the bottom 31e of the chassis as illustrated in FIGS. 2A-2B. The spring 34 is loaded such that the rest position of the spring 34 corresponds to the rest position of the shutter 33, in which the latter opens up the opening 37 in the bottom 31e. By contrast, when the shutter 33 is moved closer to the opening 37, from its rest position, i.e. when the first end 34a of the spring is moved closer to the second end 34b of the spring, the spring 34 exerts a force that tends to return the shutter 33 to its rest position.

In operation, when the distribution line 10 is filled with ambient air (normal configuration in which there is no striking of one of the reservoirs R1, R2), the torsion spring 34 urges the shutter 33 into a rest position in which it opens up the opening in the bottom 31e and therefore opens the fluid passage P.

Conversely, when a reservoir R1, R2 is struck, the pressure (around 1000 psi) exerted by the release from the reservoir and the movement of the pressurized extinguishing agent in the distribution line 10 exerts a force on the panel 33a of the shutter (and consequently on the torsion spring 34) that tends to move the latter to its shut-off position. This force is greater than the force of the spring 34 (the spring is chosen according to this criterion) that holds the shutter 33 in its rest position, and the shutter 33 consequently moves into its shut-off position.

When the pressure in the distribution line 10 decreases (i.e. when all of the extinguishing agent in a struck reservoir has been released into the fire zones Z1, Z2), the force exerted on the shutter 33 decreases and the torsion spring 34 returns the shutter 33 to its rest position. The fluid passage P is once again open for evacuation of fluids other than the extinguishing agent.

The drainage device 30 thus makes it possible to drain the water that could accumulate at the low point 21 of the distribution line 10 and to avoid the formation of a lump of ice that could obstruct the distribution line 10. Starting from the striking of a reservoir R1, R2, and for as long as the distribution line 10 is pressurized, the drainage device 30 according to the disclosure herein makes it possible to limit the loss of extinguishing agent.

The disclosure herein thus makes it possible to avoid increasing the volume of agent in the reservoirs R1, R2

(aimed at compensating for the loss of agent through the drainage hole in the prior art) and therefore to limit the volume/mass of the on-board reservoirs.

Figure 3:
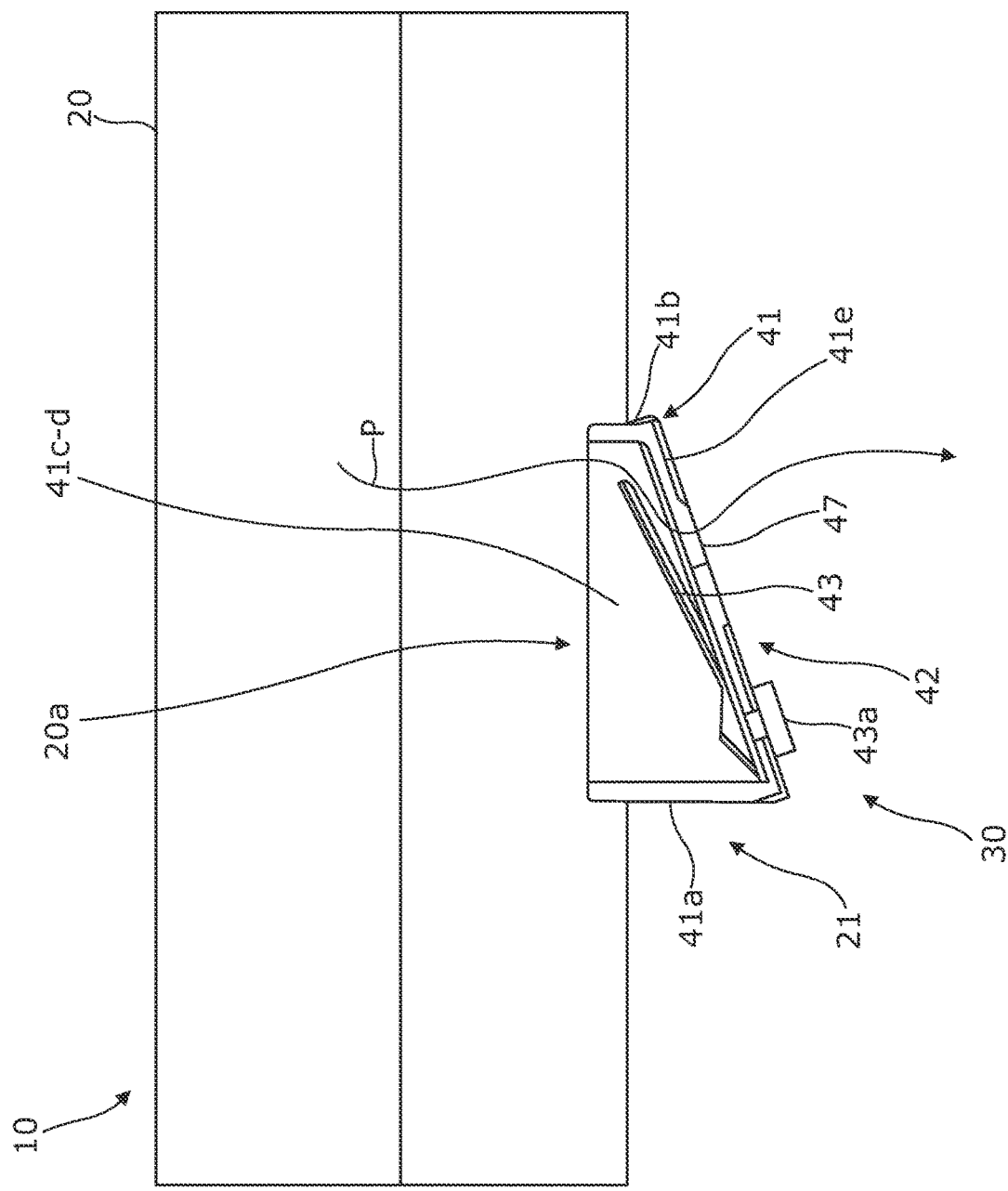
FIG. 3 is a view similar to FIG. 2A, of a cross section of a drainage device of the distribution line in FIG. 1, according to a second embodiment of the disclosure herein.

With reference to FIG. 3, and in another embodiment of the disclosure herein, the drainage device 30 comprises a chassis 41 fastened to a pipe 20, and a mechanism 42 for shutting off the fluid passage P, in which the shut-off mechanism 42 comprises a spring leaf 43 fastened to the chassis 41.

In this embodiment, the chassis 41 has the overall shape of an open housing with four lateral walls 41a-d that are parallel in pairs and a planar wall 41e that is fastened to the four lateral walls 41a-d and forms the bottom of the chassis 41.

The lateral walls 41a-d are all fastened to the pipe 20, for example by leaktight welding, at an opening 20a made in the pipe 20 in line with the low point 21. The lateral walls 41a-d extend entirely out of the pipe 20, towards the bottom thereof, in order not to impede the passage of the extinguishing agent. The bottom 41e of the chassis is thus at a distance from the pipe 20.

The bottom 41e of the chassis has a through-orifice 47 passing through it in order to form an opening allowing evacuation of the liquids at the low point. A fluid can flow in the fluid passage P that goes from the pipe 20 to the drainage device 30 and comprises the opening 20a made in the pipe 20 in line with the low point 21 and then the through-opening 47 in the bottom 41e of the chassis.

The spring leaf 43 is arranged inside the chassis 41, i.e. between the lateral walls 41a-d, and fastened to the bottom 41e of the chassis. The spring leaf 43 is fastened via conventional fastening, such as rivets 43a for example. The spring leaf 43 extends partially above the drainage hole 47.

The spring leaf 43 is a thin flexible strip and is preloaded into a rest position in which it is curved upwards with respect to the bottom 41e and opens up the through-orifice 47 so as to open the fluid passage P. The spring leaf 43 is able to move between its rest position and a shut-off position in which it is pressed against the bottom 41e and shuts off the through-orifice 47 so as to close the fluid passage P, thereby preventing the flow of a fluid out of the distribution line 10.

In operation, when the distribution line is filled with ambient air (normal configuration in which there is no striking of one of the reservoirs), the spring leaf 43 is in its rest position.

Conversely, when a reservoir R1, R2 is struck, the pressure exerted by the release from the reservoir and the movement of the pressurized extinguishing agent in the distribution line 10 exerts a force on the spring leaf 43 that presses it against the bottom 41e, into its shut-off position.

When the pressure in the distribution line decreases, the load exerted on the spring leaf 43 decreases and the latter returns to its rest position. The fluid passage P is once again open for evacuation of fluids other than the extinguishing agent.

Figure 4:
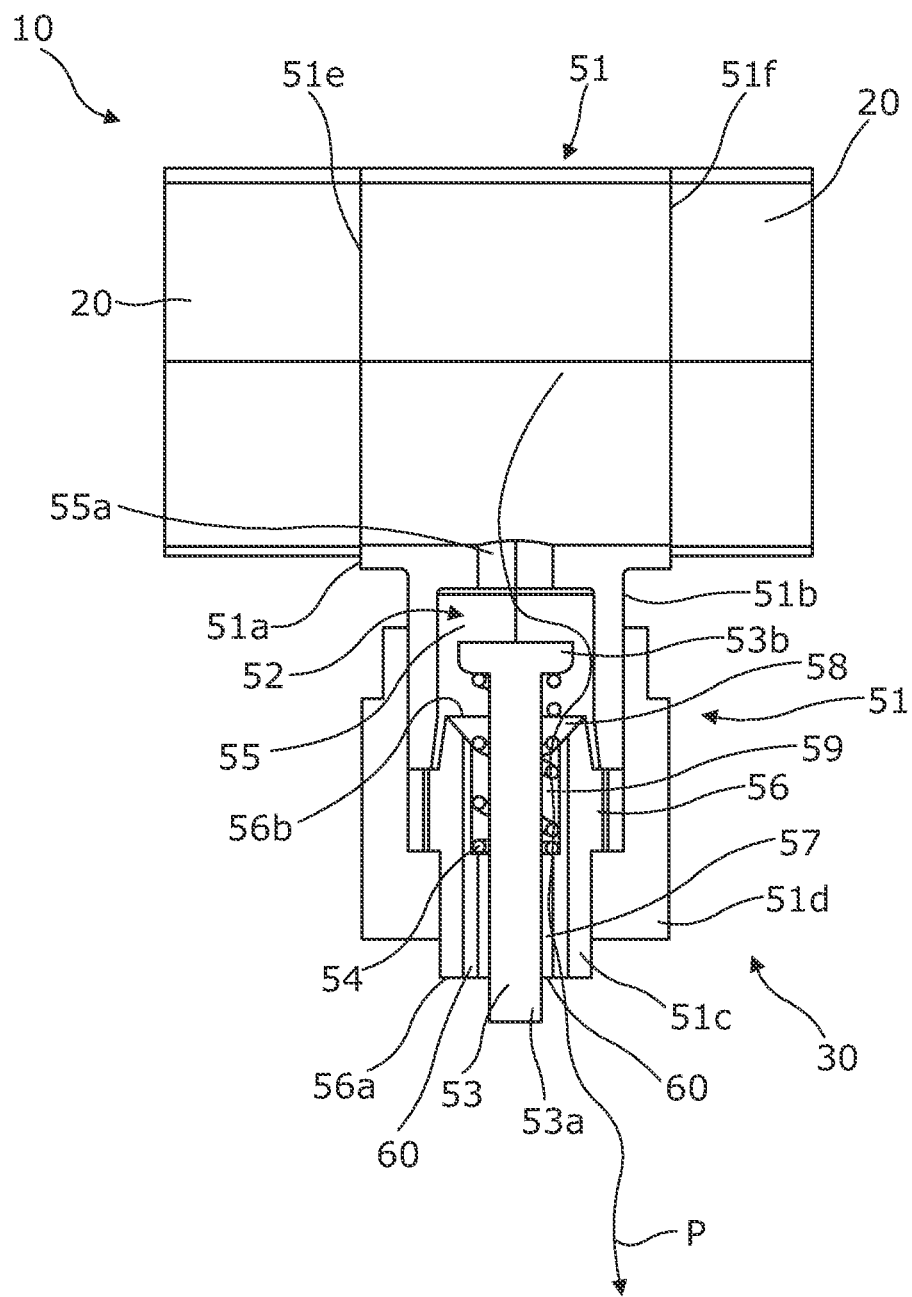
FIG. 4 is a view similar to FIG. 2A, of a cross section of a drainage device of the distribution line in FIG. 1, according to a third embodiment of the disclosure herein.

With reference to FIG. 4, and according to a third embodiment of the disclosure herein, the drainage device 30 comprises a chassis 51 having the form of a connection with a tapping duct 51b, and the mechanism 52 for shutting off the fluid passage P comprises a poppet valve 53, mounted so as to be able to move in the tapping duct 51b, and an elastic mechanism 54 mechanically coupled to the valve.

The chassis 51, which is for example of the T-shaped type, comprises a main body 51a to which is fastened the tapping duct 51b protruding out of the main body 51a, an intermediate part 51c arranged partially in the tapping duct 51b and guiding the valve 53, and a nut 51d for fastening the intermediate part 51c to the tapping duct 51b.

The main body 51a is hollow and cylindrical in shape, and is connected to a pipe 20 of the distribution line 10 by conventional approaches, for example of the screwing or welding type, at each of its ends 51e-f.

The tapping duct 51b, which is cylindrical in shape, comprises a blind bore 55 and a through-hole 55a made in the bottom of the blind bore. The through-hole 55a opens into the main body 51a, passing through the external wall of the body. The tapping duct 51b extends lengthwise downwards such that a fluid arriving in the main body 51a is evacuated from the body, under the effect of gravity, through the through-hole 55a. It will be noted that in the example in FIG. 4, the tapping duct 51b extends lengthwise in a radial direction of the main body 51a.

The intermediate part 51c has a cylindrical shape and comprises a collar 56, placed approximately halfway along the intermediate part 51c. Furthermore, the intermediate part 51c is machined and comprises, at its first end 56a, a first bore 57 with a diameter substantially greater than the diameter of the valve stem 53a and, at its second end 56b, a countersink 58 followed by a second bore 59 that is concentric with the first bore 57 and the countersink 58 and has a diameter greater than the diameter of the first bore 57. The first bore 57 opens into the second bore 59, and the countersink opens into the second bore 59.

The bottom of the second bore 59 has a multitude of orifices 60, known as drain discharge orifices, passing through it, which orifices open onto the first end 56a of the intermediate part 51c. The countersink 58 has a shape that complements that of the valve head 53b so as to form a valve seat.

The perimeter of the tapping duct 51b is threaded. The intermediate part 51c is inserted partially into the tapping duct, into the blind bore 55, and is held in place in the latter by the nut 51d screwed onto the perimeter of the tapping duct.

The intermediate part 51c is inserted, via its second end 56b, into the bore 55 in the tapping duct 51b and a first shoulder of the collar 56 butts against the edge of the tapping duct 51b. The nut 51d comprises a shoulder that presses against a second shoulder of the collar 56 so as to hold the intermediate part 51c against the edge of the tapping duct 51b. The contact between the intermediate part 51c and the tapping duct 51b alone ensures the sealing between these two parts.

A fluid can flow in the fluid passage P that goes from a pipe 20 to the drainage device 30 and comprises the through-hole 55a made at the bottom of the blind bore 55 in the tapping duct 51b, the valve seat 58, and the drain discharge orifices 60.

The valve 53 has its stem 53a partially accommodated in the first bore 57 in the intermediate part 51c in order to guide it in translation. The head 53b of the valve is arranged between the valve seat 58 and the bottom of the blind bore 55 in the tapping duct.

The valve 53 is mounted in a sliding connection on the intermediate part of the chassis between a rest position in which its head 53b is at a distance from the valve seat 58 and a shut-off position in which its head 53b closes the valve seat 58 and closes the fluid passage P, thus preventing the flow of a fluid out of the distribution line 10.

The elastic mechanism 54 is a compression spring of helicoidal shape, known as a lifting spring, fitted onto the stem 53a of the valve 53 and accommodated in the second bore 59 in the intermediate part. One end of the spring rests on the bottom of the second bore 59 of the intermediate part.

The lifting spring 54 is loaded such that the rest position of the spring corresponds to the rest position of the valve 53. By contrast, when the head 53b of the valve is moved closer to the valve seat 58, from the rest position of the valve, the load of the spring returns the valve 53 to its rest position.

In operation, when the distribution line 10 is filled with ambient air (normal configuration in which there is no striking of one of the reservoirs), the lifting spring 54 urges the valve into a rest position in which it opens the valve seat 58 and consequently the fluid passage P.

Conversely, when a reservoir R1, R2 is struck, the pressure exerted by the release from the reservoir and the movement of the pressurized extinguishing agent in the distribution line 10 exerts a force on the valve head 53b (and consequently on the lifting spring 54) that tends to move the latter into its shut-off position. This force is greater than the force of the lifting spring 54 that holds the valve 53 in its rest position (the spring is chosen according to this criterion), and the valve 53 consequently moves into its shut-off position.

When the pressure in the distribution line 10 decreases, the force exerted on the valve/spring decreases and the latter returns the valve 53 to its rest position. The fluid passage P is once again open for evacuation of fluids other than the extinguishing agent.

As an alternative (not shown in the figures) to this embodiment, instead of a T-shaped connection, the chassis is in the form of a tapping flange. In this case, the differences relative to that which has been described for the figure are that:

- the chassis comprises a main body arranged around a pipe 20 (instead of a main body serving as a connection between two pipes); and
- the tapping duct comprises a through-hole that opens into the pipe (and not into the main body) and passes through the wall of a pipe.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly comprising:
    a turbomachine attached to a pylon and comprising a plurality of fire zones, each of which comprises one or more nozzles; and
    a fire-fighting system comprising:
        two reservoirs of pressurized extinguishing agent that are in the pylon; and
        a distribution line that connects each of the reservoirs to the one or more nozzles in each of the plurality of fire zones and comprises:
            a set of pipes that are connected to one another and have, between the two reservoirs and the one or more nozzles of the plurality of fire zones, one or more low points; and
            a fluid drainage device for each of the one or more low points, the fluid drainage device comprising:
                a fluid passage for evacuation of a fluid out of the distribution line; and
                a shut-off mechanism for shutting off the fluid passage, the shut-off mechanism being movable, under effect of a pressure prevailing in the distribution line, between a first position, in which it opens the fluid passage, and a second position, in which it closes the fluid passage;
            wherein the second position is reached when the pressure in the distribution line is greater than or equal to a predetermined pressure.

2. The propulsion assembly according to claim 1, wherein the shut-off mechanism comprises a mobile device that is movable between a rest position, in which it opens the fluid passage and a shut-off position in which it closes the fluid passage.

3. The propulsion assembly according to claim 2, wherein:
    the drainage device comprises a chassis fastened to at least one pipe of the set of pipes; and
    the shut-off mechanism is fastened to the chassis of the drainage device.

4. The propulsion assembly according to claim 3, wherein the shut-off mechanism is a spring leaf.

5. The propulsion assembly according to claim 3, wherein the shut-off mechanism comprises an elastic mechanism mechanically coupled to the mobile device to return the mobile device to the rest position.

6. The propulsion assembly according to claim 5, wherein:
    the mobile device is a shutter mounted in a pivot connection on the chassis; and
    the elastic mechanism is a torsion spring fastened to the shutter and to the chassis.

7. The propulsion assembly according to claim 5, wherein:
    the mobile device is a valve mounted movable in translation in the chassis; and
    the elastic mechanism is a spring fitted onto the valve.

* * * * *